United States Patent
Hosoi et al.

(10) Patent No.: US 7,285,332 B2
(45) Date of Patent: Oct. 23, 2007

(54) LAMINATE ROLL

(75) Inventors: Masahiro Hosoi, Matsuyama (JP);
Kazuo Yahata, Matsuyama (JP);
Junichi Shibata, Matsuyama (JP);
Takeshi Yamasaki, Tokyo (JP);
Tomomi Yukumoto, Tokyo (JP)

(73) Assignees: Teijin Chemicals Ltd., Tokyo (JP);
Sony Corporation, Tokyo (JP)

( * ) Notice: Subject to any disclaimer, the term of this patent is extended or adjusted under 35 U.S.C. 154(b) by 884 days.

(21) Appl. No.: 10/363,637

(22) PCT Filed: Jul. 2, 2002

(86) PCT No.: PCT/JP02/06701

§ 371 (c)(1),
(2), (4) Date: Mar. 4, 2003

(87) PCT Pub. No.: WO03/004270

PCT Pub. Date: Jan. 16, 2003

(65) Prior Publication Data

US 2003/0184891 A1 Oct. 2, 2003

(30) Foreign Application Priority Data

Jul. 5, 2001 (JP) .............................. 2001-205258

(51) Int. Cl.
*B32B 27/36* (2006.01)
*B29D 17/00* (2006.01)
*B29C 65/54* (2006.01)

(52) U.S. Cl. .................. 428/412; 428/483; 430/271.1; 430/287.1; 264/1.24; 264/1.33; 264/1.34; 264/1.6; 264/1.9; 264/2.7; 264/153; 264/160; 264/241; 264/250; 156/256

(58) Field of Classification Search ................ 264/153, 264/157, 160, 1.24, 13.33, 1.34, 1.6, 1.9, 264/1.7, 2.7, 1.33, 241, 250; 359/883; 83/13; 369/286, 288; 430/287.1, 271.1; 156/256
See application file for complete search history.

(56) References Cited

U.S. PATENT DOCUMENTS 2,529,083 A * 11/1950 Keefe .......................... 425/291
3,768,946 A * 10/1973 Matuschke .................. 425/363
4,956,215 A * 9/1990 Fujita et al. ................ 428/64.6

(Continued)

FOREIGN PATENT DOCUMENTS

EP 384041 A 8/1990

(Continued)

OTHER PUBLICATIONS

"One sided 12 Gbyte Large-Capacity Optical Disk", *O plus E*, vol. 20, No. 2, p. 183, 1998.

(Continued)

*Primary Examiner*—Edmund H. Lee
(74) *Attorney, Agent, or Firm*—Sughrue Mion Pllc.

(57) ABSTRACT

A wound laminate obtained by laminating a plastic film composed of an aromatic polycarbonate comprising bisphenol A as an aromatic dihydroxy component, and a protective film composed of an aromatic polyester, using an intervening adhesive having a weak adhesive strength of 3-50 gf (0.0294-0.49 N), and winding the laminate. The wound laminate is used as a transparent protective layer (protective film) for an optical disk to fabricate a film surface side-incident optical disk.

11 Claims, 4 Drawing Sheets

U.S. PATENT DOCUMENTS 5,364,735 A * 11/1994 Akamatsu et al. ..... 430/270.12
6,245,382 B1 * 6/2001 Shvartsman et al. ..... 427/208.2

FOREIGN PATENT DOCUMENTS

| EP | 0 331 392 A2 | | 9/1999 |
|---|---|---|---|
| JP | 59188859 A | * | 10/1984 |
| JP | 8-235638 A | | 9/1996 |
| JP | 2000-233466 A | | 8/2000 |
| JP | 2001-243658 A | | 9/2001 |
| JP | 2001-243659 A | | 9/2001 |
| WO | WO 99/25775 A1 | | 5/1999 |
| WO | WO 00/74937 A1 | | 12/2000 |

OTHER PUBLICATIONS

"Optical Disks and Peripheral Materials 98-2", *Summary of Lectures by Japan Polymer and Optical Electronics Research Society*, 1999.

* cited by examiner

LAMINATE ROLL

TECHNICAL FIELD

The present invention relates to a wound laminate of a polycarbonate film used for optical applications, and to an optical disk fabrication process employing it. More specifically, the invention relates to a thin polycarbonate film (throughout the present specification, "film" may refer to either a film or a sheet) used as a transparent protective layer for an optical disk on which writing, reading or erasure of data is performed with laser light or the like, and to an optical disk production process employing it.

BACKGROUND ART

Polycarbonate resins are widely used for optical applications because of their excellent transparency, impact resistance, heat resistance, dimensional stability and workability. For example, various types of laser light optical disks have been researched, developed and marketed as high-density, large-capacity recording media. In particular, with the recent advent of the multimedia age, various techniques have begun to be developed to allow recording of large volumes of video data on optical disks. One of the technologies that has been proposed is a film surface side-incident optical disk wherein data is read from one side utilizing a protective film surface side opposite to the side of the polycarbonate substrate, and this has been described in several publications. These include Japanese Unexamined Patent Publication (Kokai) HEI No. 8-235638, "One-Sided 12 Gbyte Large-Capacity Optical Disk" (O plus E, Vol.20, No.2, p.183 (February, 1998)) and "Optical Disks and Peripheral Materials 98-2" (Summary of Lectures by the Japan Polymer and Optical Electronics Research Society, (Jan. 22, 1999)).

Figure 1:
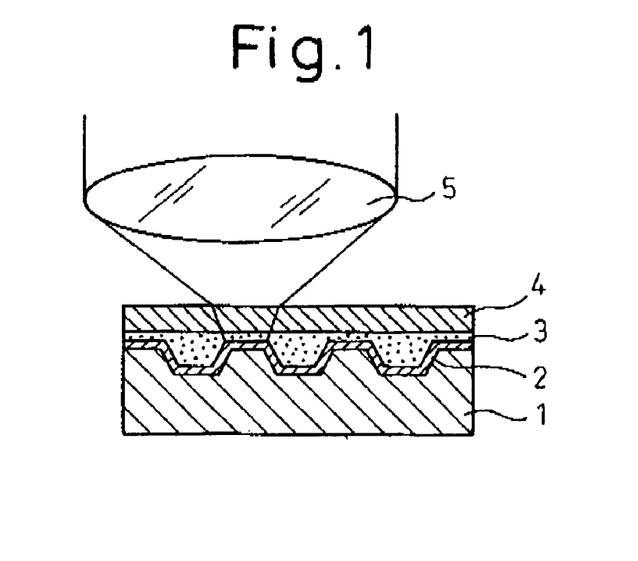
FIG. 1 is schematic illustration of a film surface side-incident optical disk and writing/reading method.

Referring to FIG. 1, such film surface side-incident techniques are characterized in that a data recording layer 2 consisting of a reflective film or recording film is formed on at least one side of a disk substrate 1 having a pattern of irregularities such as pits or grooves, on which there is further formed a thin film surface of about 0.1 mm thereover, and in that the film surface is formed by laminating a plastic film 4 onto the disk substrate through an adhesive layer 3. Data recording and reading is accomplished from the film surface side, and laser light focused through a lens 5 is applied onto the irregularity pattern.

When a transparent protective layer is adhered onto the optical disk substrate, it is considered preferable in terms of productivity to successively attach the plastic film which is to serve as the transparent protective layer onto the optical disk substrate, by pulling it out from a wound laminate of the plastic film. However, films intended for optical purposes which require extremely flat surfaces have poor slidability due to their high flatness, and normally cannot be wound into rolls as wound laminates.

Most conventional polycarbonate wound laminates for optical purposes are obtained by laminating an adhesive protective film onto a polycarbonate film. That is, an extremely flat plastic film for optical use is laminated by attachment of a protective film with a weakly adhesive side, whereby not only is that surface protected, but the structure of the opposite side of the protective film is also suitably rough to facilitate sliding so that the laminated film can be easily wound into long rolls. Such a protective film has a structure formed, for example, by coextrusion of polymers such as polyethylene and polyvinyl acetate, with the polyvinyl acetate side exhibiting adhesion for the polycarbonate film side. The films are attached together just prior to winding and gently nipped and taken up with a winder to produce a wound laminate.

As the step of forming a thin transparent protective layer on an optical disk, particularly using a polycarbonate film as the plastic film in a wound laminate, a polyethylene/polyvinyl acetate coextruded protective film was pulled out from a wound laminate, the protective film was released from the laminate and disk of the polycarbonate film was punched out and attached onto a polycarbonate optical disk. However, optical disks provided with thin transparent protective layers formed in such a manner have numerous irregularities (optical distortions) on the surface which are readily visible (although such surface irregularities are often invisible under ordinary light), and it has been confirmed that such surface irregularities (optical distortions) are a cause of major output fluctuations during signal input and output to and from the optical disk.

The present invention has been achieved in light of the circumstances described above, and its object is to provide a would laminate for a thin plastic film for data recording media which exhibits none of the problems alluded to above, allows large-capacity media to be obtained in an inexpensive manner, and offers greater convenience and industrial productivity, as well as an optical disk production process employing the wound laminate.

SUMMARY OF THE INVENTION

The present invention has been accomplished after diligent research in pursuit of the aforementioned object, whereby it was discovered that said object can be achieved by the following construction.

(1) A wound laminate obtained by laminating a plastic film composed of an aromatic polycarbonate comprising bisphenol A as an aromatic dihydroxy component, and a protective film composed of an aromatic polyester, using an intervening pressure-sensitive adhesive having a weak adhesive strength of 3-50 gf (0.0294-0.49 N), and winding the laminate.

(2) A wound laminate according to (1) above, wherein the plastic film has thickness variation of no greater than 4 μm, a thermal dimensional change of no greater than 0.07%, and an in-plane retardation of no greater than 15 nm.

(3) A wound laminate according to (1) or (2) above, wherein the protective film is a polyester film composed of polyethylene terephthalate or polyethylene naphthalate and having a Young's modulus of 450 kgf/mm$^2$ (4413 MPa) or greater.

(4) A wound laminate according to (2) or (3) above, wherein the plastic film has a thickness of 30-100 μm, a total light ray transmittance of at least 90%, a residual solvent content of no greater than 0.3 wt %, a thickness-direction retardation (K value) of no greater than 100 nm, and a surface roughness Ra of no greater than 5.0 nm on both sides.

(5) A wound laminate according to any one of (1) to (4) above, wherein the plastic film is formed by a solution casting process.

(6) A wound laminate according to any one of (1) to (5) above, which is used to form a transparent protective layer on an optical disk.

(7) A process for fabricating an optical disk characterized by using a wound laminate according to any one of (1) to (6) above to form a transparent protective layer on a film surface side-incident optical disk.

(8) A process for fabricating an optical disk according to (7) above, which comprises a step of punching out a disk-shaped laminate film from said wound laminate and a step of adhering the plastic film of the disk-shaped laminate film onto an optical disk substrate.

(9) A process for fabricating an optical disk according to (8) above, wherein the plastic film is adhered to the optical disk substrate after the protective film is released from said disk-shaped laminate film.

(10) A process for fabricating an optical disk according to (8) above, wherein the protective film is released from said disk-shaped laminate film after the plastic film of the disk-shaped laminate film is adhered onto the optical disk substrate.

(11) A process for fabricating an optical disk according to any one of (7) to (10) above, wherein the plastic film and optical disk substrate are adhered using a liquid adhesive or film-like adhesive.

The terms used throughout the present specification are defined as follows.

"Optical disk" will refer to a disk-shaped optical medium formed mainly from a polycarbonate resin, and provided with a data recording layer.

"Transparent protective layer (light-transmitting layer)" will refer to a transparent material which covers the data recording layer of an optical disk and has the function of protecting the data recording layer and allowing writing/reading by irradiation of laser light through the transparent material.

"Protective film" will refer to a film wound together with a plastic film or the like when forming a wound laminate of the plastic film, in order to prevent damage to its surface and maintain satisfactory "roll formation" of the wound laminate.

In an optical disk with an attached polycarbonate film as the transparent protective layer, it was found that irregularities on the film surface which are implicated as causing the optical distortion mentioned above can be eliminated by winding out the wound laminate, releasing the protective film, heat treating the polycarbonate film at a temperature slightly lower than the glass transition temperature, and then punching out a disk for attachment to the polycarbonate optical disk. However, this procedure requires a heat treatment step of the film during preparation of the transparent protective layer. Also, the polycarbonate film from which the protective film has been released often contains static build-up which attracts fine dust from the atmosphere, and the dust intervenes between the optical disk and transparent protective layer thereby impairing the outer appearance of the disk and increasing output fluctuation.

An attempt was made to fabricate a protective film in which none of the optical distortion mentioned above is caused even when a wound laminate is formed and it is wound out. The possible reasons for such optical distortion include (i) optical distortion in the polycarbonate film and (ii) distortion produced when the protective film is wound up with the polycarbonate film; however, experimentation has demonstrated that such problems cannot be resolved even if thickness variation in the polycarbonate film is adequately reduced to achieve optical uniformity. It has been found that the major factors exerting an adverse effect on the polycarbonate film of the wound laminate are (i) thickness variation in the protective film, (ii) transfer of substances on the pressure-sensitive adhesive side of the protective film to the polycarbonate, and (iii) a low Young's modulus of the protective film.

Specifically, ordinary protective films such as polyethylene/polyvinyl acetate coextruded films are formed with one side comprising a comparatively soft, low adhesive polymer material with a relatively low Young's modulus. However, because of the low Young's modulus of the protective film material, the film is susceptible to deformation by exterior force. Consequently, when a laminate of polycarbonate and the protective film is sampled from a wound roll and the thickness variation thereof measured, it is very common to observe a notable increase in thickness variation in the running direction of the film, and although the thickness variation in the polycarbonate film separated from the laminate does not increase at all, thickness variation is found in the protective film. This is believed to occur because when the protective film is wound out and attached to the polycarbonate film while flattening out the wrinkle-prone protective film, this creates tension in the protective film and results in a certain degree of stretching of the protective film, thereby producing plastic deformation. When it is laminated by attachment in this state to the polycarbonate film, and then wound up into a roll to form a wound laminate, the protective film presumably produces a tightening force and slight local distortion in the polycarbonate film. It is believed that the thickness variation in the protective film is itself significant and deformation of the protective film increases during wind out, which adversely affects the laminated and wound polycarbonate film. When a polycarbonate film with satisfactory thickness variation and a length of approximately 1000 m was wound together with protective film and the roll was kept at ordinary temperature for several months, and the thickness variation of the laminated film was measured after unwinding, it was found that the thickness variation tended to be slightly greater in the sections of the film closer to the winding core. However, a polycarbonate film which was obtained after releasing the protective film from the wound laminate exhibited no increase in thickness variation. It is conjectured that a large amount of protective film tightened in the wound laminate created further adhesion of the protective film on the polycarbonate film, thus exerting force on the polycarbonate film and impairing the flatness of the polycarbonate film.

In order to solve this problem, the present inventors have previously proposed using a plastic wound laminate characterized in that a plastic film and a protective film covering the surface of the plastic film are laminated without employing an adhesive and wound up (Japanese Patent Application No. 2000-388724). However, new problems have been found to occur when using such a wound laminate. Specifically, it has been discovered that, when the optical disk is manufactured by a method wherein a narrow strip is first formed by slitting the film from the rolled film before punching out the disk, or when treatment is carried out to form a cured resin layer on the side of the plastic film without the protective film, an adhesive layer is necessary to prevent flaking off of the protective film.

Consequently, the most preferred wound laminate is a wound laminate wherein the initial protective film functions just up until attachment to the disk, without creating distortion or otherwise adversely affecting the film which is to be punched out into a disk shape.

The present inventors achieved the present invention upon discovering that provision of this manner of wound laminate is possible by using as the protective film for the wound laminate a material with a high Young's modulus which is resistant to deformation, and by forming a pressure-sensitive adhesive layer with a specific adhesive strength on the surface of the protective film.

PREFERRED EMBODIMENTS OF THE INVENTION

The present invention will now be explained in greater detail.

(Wound Laminate)

A "wound laminate" according to the invention is one obtained by lamination of a polycarbonate plastic film and a protective film covering one surface of the plastic film, wherein a polyester film is used as the protective film via an adhesive layer with an adhesive strength of 3-50 gf (0,0294-0.49 N) for the polycarbonate film, and winding the laminate into a roll.

Figure 2:
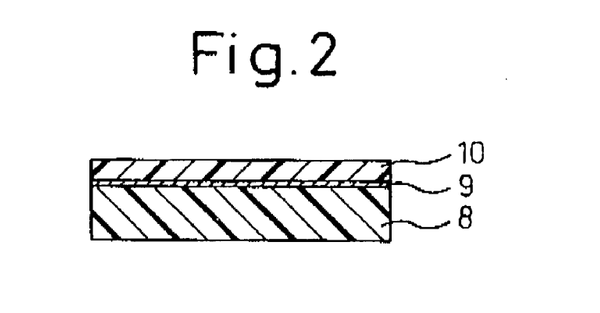
FIG. 2 is cross-sectional schematic view of the film of a wound laminate.

FIG. 2 shows the cross-sectional structure of the wound laminate, wherein reference numeral 8 is a plastic film, 9 is an adhesive layer and 10 is a protective film.

Figure 3:
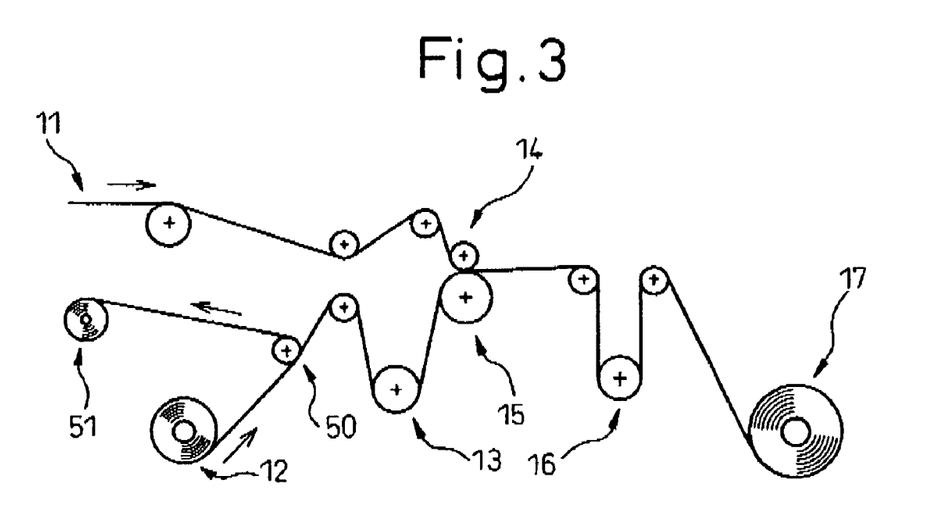
FIG. 3 is an illustration of a method for manufacturing a wound laminate.

FIG. 3 shows a method of manufacturing a wound laminate, wherein a plastic film 11 already having a surface coated with an adhesive layer and a protective film 12 are fed between a (metal) nip roll 14 and a (rubber) nip roll 15, for bonding. The adhesive layer may alternatively be formed on the protective film 12. Before bonding at the nip rolls, the protective film 12 is subjected to tension with an expander roll 13, while the bonded laminated film is tension-adjusted with a dancing roll 16. The laminated film is then wound up with a winder to obtain a wound laminate 17. The protective film 12 coated on the surface with an adhesive layer will usually have its adhesive surface covered with a release sheet or release film, and is supplied in the form of a roll by being wound. In such cases, a roll 50 is used to peel off the release sheet or release film from the protective film. The roll of the peeled off release sheet or release film is shown as 51. The surface of the roll 13 which contacts with the adhesive side of the protective film, may be subjected to a non-tackifying treatment.

(Plastic Film)

<Polycarbonate Film (Transparent Protective Layer)>

The plastic film used for the invention is an aromatic polycarbonate film comprising bisphenol A as aromatic dihydroxy component. The chemical composition and production method for the polycarbonate resin used as the plastic film of the invention will be described in detail later; as polycarbonate resins generally exhibit excellent transparency, impact resistance, heat resistance, dimensional stability and workability, they are ideal as the plastic film for the transparent protective layer of an optical disk of the invention. Incidentally, "transparent" according to the invention means transparent (optically transparent) with respect to light (such as laser light, etc.) used for writing and reading of optical disks.

It was found, surprisingly, that all of the aforementioned problems are overcome by a wound laminate wherein a specific polyester protective film is used as the protective film for this specific polycarbonate plastic film and a pressure-sensitive adhesive layer with an adhesive strength of 3-50 gf (0.0294-0.49 N) is situated between them before winding, in such a manner that the initial protective film functions directly up until attachment to the disk, and that it also provides excellent function when used as a transparent protective layer for an optical disk. In order to achieve the aforestated object, it was found to be particularly advantageous for the plastic film of the optical disk transparent protective layer to be one exhibiting specified physical properties.

Thus, the plastic film used according to the invention preferably has thickness variation of no greater than 4 μm, a thermal dimensional change of no greater than 0.07% and an in-plane retardation of no greater than 15 nm, and especially it preferably has a thickness of 30-100 μm, a thickness variation of no greater than 4 μm, a thermal dimensional change of no greater than 0.07%, a total light ray transmittance of at least 90%, a residual solvent content of no greater than 0.3 wt %, an in-plane retardation of no greater than 15 nm, a maximum thickness-direction retardation (K value) of no greater than 100 nm, and a surface roughness Ra of no greater than 5.0 nm on both sides of the film.

Since the plastic film of the invention, though being a protective layer, is used as a part of an optical system, its thickness is important for optimum input/output of optical disk signals. A more preferred range for the plastic film thickness is 40-100 μm, and an even more preferred range is 40-80 μm. The plastic film thickness will normally be selected depending on the wavelength of the laser light source used for writing and reading of optical disk signals (for example, "One-Sided 12 Gbyte Large-Capacity Optical Disk" O plus E, Vol.20, No.2, p.183 (February, 1998)).

The thickness variation in the plastic film is preferably no greater than 4 μm, more preferably no greater than 2 μm and even more preferably no greater than 1 μm. If the thickness variation of the plastic film is too large, the optical distortion becomes significant to the point of problematically increasing the input/output fluctuation (noise) of the optical disk signals.

The recording layer of the optical disk is repeatedly irradiated with incident laser light or the like at a high energy density in a small area of a micrometer size. Thermal stress is therefore produced in a small area near the recording layer. Particularly in the case of repeated optical writing, the material is affected and micropeeling occurs at the recording layer interface and elsewhere, thereby lowering the recording reliability. For this reason, the film preferably has high thermal stability. The thermal dimensional stability is one measure of the thermal stability, and a large thermal dimensional change is not preferred because it tends to lead to the problems mentioned above (micropeeling at the interface between the recording layer and transparent protective layer) due to thermal stress at the interface between the optical disk and transparent protective layer. The thermal dimensional change is preferably no greater than 0.07%, and more preferably no greater than 0.05%.

The total light ray transmittance of the plastic film of the invention is preferably 90% or more, and more preferably 92% or more. A higher total light ray transmittance is preferred for preventing deterioration of optical signals passing through the transparent protective layer. At less than 90%, optical signal deterioration presents an obstacle to optical disk use.

The plastic film of the invention preferably has a residual solvent content of no greater than 0.3 wt %, and more preferably no greater than 0.1 wt %. If the residual solvent content of the film is too great, the residual solvent may vaporize during surface treatment by coating, sputtering or the like, producing an undesirable adverse effect.

During input and output of signals, laser light passes through the interior of the thin film of the plastic film of the invention. Optical disturbance may sometimes occur as a result, and can affect the optical pickup servo signal or signal level. For this reason, the in-plane retardation of the plastic film should preferably be as small as possible, and is preferably no greater than 15 nm. It is more preferably no greater than 8 nm, and even more preferably no greater than 6 nm. Also, variation within the plane of the film is preferably no greater than 8 nm and more preferably no greater than 6 nm, in order to reduce modulation of the reading light for the reproduction signal and to stabilize the reproduction signal level. Although the in-plane retardation of the plastic film may be less than 2 nm, it does not usually need to be that low.

The thickness-direction retardation (K value) of the plastic film of the invention is preferably no greater than 100 nm, more preferably no greater than 70 nm and even more preferably no greater than 50 nm. The parameter K value, which indicates the three-dimensional refractive index anisotropy and is defined below, is a cause of increased noise when large. The K value of the plastic film is restricted from this standpoint.

The surface roughness Ra in the plastic film of the invention on both sides is preferably no greater than 5.0 nm, more preferably no greater than 3.0 nm and even more preferably no greater than 2.5 nm. If the surface roughness is too great, the surface irregularity sections may cause light scattering and thereby undesirably increase noise. The surface roughness Ra is preferably as low as possible, but the lower limit will generally be about 1.5 nm.

The plastic film of the invention is preferably formed by solution casting of an aromatic polycarbonate. A solution cast film is preferred as the resulting plastic film is resistant to fine streak-like thickness variation and adhesion of foreign matter. The polycarbonate-dissolving solvent used for solution casting is preferably methylene chloride, 1,3-dioxolane or a mixture of the two.

The plastic film of the invention is used as a transparent protective film for an optical disk. Care must be taken when handling an optical disk in order to prevent surface damage or scratches. At least one side of the plastic film may therefore be subjected to surface-hardening treatment (hard-coating treatment) by a conventional publicly known method.

<Polymer Resin>

Polymer resins which may be used in the plastic film of the invention include polycarbonates comprising as the aromatic dihydroxy component 2,2-bis(4-hydroxyphenyl) propane (also known as bisphenol A), which exhibits excellent heat resistance, transparency, optical property and film-forming properties.

The plastic film may be formed by solution casting, but since the polymer is preferably an aromatic polycarbonate for a greater effect according to the invention, a method of forming a polycarbonate film will be described below.

Here, a "polycarbonate" is a compound obtained by reacting an aromatic dihydroxy compound with a carbonate bond-producing compound such as phosgene, diphenylcarbonate or the like, in the form of a solution, bulk, melt, etc.

The polycarbonate of the invention may be used in combination with any of the following aromatic dihydroxy compounds other than bisphenol A as alternative aromatic dihydroxy components (for example, at up to 20 mole percent of the total). specific examples of such compounds are listed below.

Specifically, these include bis(hydroxyaryl)alkanes such as 1,1-bis(4-hydroxy-3-t-butylphenyl)propane, 2,2-bis(4-hydroxy-3-t-butylphenyl)propane, 2,2-bis(4-hydroxyphenyl)propane, 2,2-bis(4-hydroxy-3-bromophenyl)propane, 2,2-bis(4-hydroxy-3-bromophenyl)propane and 2,2-bis(4-hydroxy-3,5-dibromophenyl)propane, bis(hydroxyaryl)cycloalkanes such as 1,1-bis(4-hydroxyphenyl)cyclohexane and 1,1-bis(4-hydroxyphenyl)-3,3,5-trimethylcyclohexane, fluorenes such as 9,9-bis(4-hydroxyphenyl)fluorene, dihydroxyaryl ethers such as 4,4'-dihydroxydiphenyl ether and 4,4'-dihydroxy-3,3-dimethylphenyl ether, dihydroxyaryl sulfides such as 4,4'-dihydroxydiphenyl sulfide and 4,4'-dihydroxy-3,3'-dimethylphenyl sulfide, hydroxyaryl sulfoxides such as 4,4'-dihydroxydiphenyl sulfoxide and 4,4'-dihydroxy-3,3'-dimethylphenyl sulfoxide, and dihydroxyarylsulfones such as 4,4'-dihydroxydiphenylsulfone and 4,4'-dihydroxy-3,3'-dimethylphenylsulfone. Particularly preferred among these is 2,2-bis(4-hydroxyphenyl) propane (bisphenol A). These aromatic dihydroxy compounds may be used alone or in combinations.

The polycarbonate used may also have a portion of the aromatic dihydroxy component replaced with a terephthalic acid and/or isophthalic acid component. By using such a structural unit as a constituent of a bisphenol A polycarbonate, it is possible to improve the properties, such as heat resistance and solubility, of the polycarbonate. The present invention may also be used for these types of copolymers.

<Molecular Weight of Polymer Resin>

There are no particular restrictions on the molecular weight of a polymer resin to be used for the invention and, for example, the molecular weight of an aromatic polycarbonate may be in the range of 30,000 to 120,000 and preferably 30,000 to 80,000, as the viscosity-average molecular weight determined by viscosity measurement at 20° C. in a 0.5 g/dl concentration methylene chloride solution.

If the viscosity-average molecular weight is too small, punching out the film or sheet into a thin disk may result in fine notches in, or dust from, the punched edges. If the viscosity-average molecular weight is too large, leveling defects may tend to occur during solution casting, thereby increasing the film thickness variation.

<Solvent>

The solvent used for film formation by casting of the plastic film of the invention is not particularly restricted, and may be a commonly known solvent. As examples there may be mentioned methylene chloride, 1,3-dioxolane and mixtures thereof, or solvents containing them as major components.

Such solvents preferably contain as little water as possible for ordinary film production. When methylene chloride is used as the solvent, the water content is preferably no greater than 50 ppm, and more preferably no greater than 30 ppm. The solvent may be dewatered (dried) using a commonly known molecular sieve-filled dewatering apparatus.

<Solution Casting (Film Formation)>

A solution is prepared having an aromatic polycarbonate dissolved in the aforementioned solvent. The solution will usually be adjusted to a polycarbonate concentration of 15-35 wt %. The adjusted resin solution is extruded through an extrusion die and cast onto a support.

<Drying>

The liquid film cast on a support may be dried in the following manner, for example, to produce a film. The drying may be accomplished in an oven partitioned into several compartments and capable of varying the drying conditions (hot-air temperature, air speed, etc.) in each compartment. Immediately after casting onto the support, the liquid film is dried while minimizing surface turbulence, to prevent a leveling irregularity. For increased drying efficiency, the heating method may involve drying of the cast liquid film with hot air or heating of the belt-side liquid film surface with a heating medium. Hot air is preferably used for easier handling.

The belt surface temperature immediately after casting and the atmosphere temperature must be controlled so as not to exceed the boiling point of the polymer-dissolving solvent. If the temperature of the liquid film exceeds the boiling point, air bubbles may be produced in the film due to boiling off of the solvent. For methylene chloride as the solvent, the temperature is preferably no higher than 40° C. and more preferably no higher than 30° C.

When the solvent is methylene chloride, the subsequent compartment may be adjusted to 45-50° C. and drying conducted to a methylene chloride concentration of about 35 wt % in the liquid film so as to prevent deformation of the liquid film. For a methylene chloride solvent, the temperature in the third compartment is adjusted to 45-50° C. for a solvent concentration of about 25 wt % in the film. In the fourth compartment, the drying temperature is 50-55° C. for a solvent concentration of approximately 20 wt % in the film. In the fifth compartment, the film is cooled to 15° C. and released from the support.

<Post-drying>

The film is then further dried by post-drying for use either as an undrawn film or for purposes requiring stretching of the film. Such drying is performed while controlling the optical properties (refractive index) of the film. The drying may involve a suitable combination of known drying processes using a pin tenter wherein both edges of the film in the widthwise direction are clasped for transport, or roll hanging-type drier or an air floating-type drier, for control of the optical properties of the film. The film obtained thereby is wound as an aromatic polycarbonate film for optical use.

<Winding in Film-forming Step>

In the plastic film winding step, as described below, it is preferably wound up together with an adhesive layer-applied polyethylene terephthalate film as the protective film.

(Protective Film)

<Polyester Film>

According to the invention, the protective film wound up with the polycarbonate film is preferably a uniaxially stretched or biaxially stretched polyester film since they have high Young's moduluses.

As examples of preferred polyesters there may be mentioned polyethylene terephthalate having an acid component consisting mainly of terephthalic acid and a glycol component consisting mainly of ethylene glycol, and polyethylene naphthalate having an acid component consisting mainly of naphthalenedicarboxylic acid and a glycol component consisting mainly of ethylene glycol.

These polyesters may also be copolymerized with various secondary components (at up to 5 mole percent, for example), such as isophthalic acid or naphthoic acid, trimethylene glycol, tetramethylene glycol, and the like, in addition to the terephthalic acid or naphthalenedicarboxylic acid. The copolymerizing components other than the main components may be included within a range that does not notably reduce the Young's modulus of the biaxially stretched polyester film.

The polyester film of the invention may also contain stabilizers against light or heat, coloring agents, flame retardants, ultraviolet absorbers, antistatic agents, lubricants or the like. As lubricants there may be added inorganic particles of calcium carbonate, alumina, kaolin, silica, titanium oxide, barium sulfate, zeolite and the like, or organic particles of silicone resin, crosslinked polystyrene, acryl resin, and the like.

The intrinsic viscosity [η] of the polyester used is preferably 0.5-0.7.

The thickness of the polyester film of the invention is preferably 10-50 μm.

The polyester film may be produced by any conventional known process. Specifically, the dried polyester may be melted and extruded onto a cooling drum through a flat die and cooled to fabricate an undrawn film. The undrawn film may then be drawn either in a uniaxial direction or biaxial directions and then heat treated for enhanced thermal dimensional stability. The surface of the drawn polyester film will usually have an enhanced sliding property due to protrusions produced by an added lubricant or polymerization catalyst, etc. The surface roughness Ra of the film is preferably 10-30 nm, and preferably no large surface protrusions are present. If the roughness Ra is too great or large surface protrusions are present, this condition will be transferred to polycarbonate film surface when the polyester film is used as a protective film, thus tending to produce surface defects. If the polyester film surface roughness is smaller than 10 nm, the sliding property may be reduced, making it difficult to achieve satisfactory productivity for the polyester film.

The polyester film preferably has a Young's modulus of 450 kgf/mm$^2$ (4413 MPa) or greater and more preferably 500 kg/mm$^2$ (4903 Mpa) or greater in both the lengthwise and widthwise directions. The Young's modulus of the film is preferably not too low, as this will tend to cause deformation upon unwinding from the roll, and may produce distortion in the polycarbonate film due to a "tightening" phenomenon.

<Application of Pressure-sensitive Adhesive Layer>

The wound laminate of the invention has a pressure-sensitive adhesive layer between the plastic film and protective film, for weak adhesion with the polycarbonate film as the plastic film. Such a pressure-sensitive adhesive film may be formed by preforming a pressure-sensitive adhesive layer on the surface of either or both the protective film and plastic film, using a weak pressure-sensitive adhesive. Alternatively, the pressure-sensitive adhesive layer may be laminated between the plastic film and protective film and rolled up therewith to obtain a wound laminate according to the invention.

A method of forming the pressure-sensitive adhesive layer on one surface of the polyester film used as the protective film will now be explained by way of illustration.

The pressure-sensitive adhesive layer is preferably firmly adhered to the polyester film and has an adhesive strength of 3-50 gf (0.0294-0.49 N) with the polycarbonate film, so that there is essentially no transfer or adhesion to the polycarbonate film when the polyester film is peeled from the wound laminate. Any pressure-sensitive adhesive may be used with no particular restrictions, so long as it produces such a pressure-sensitive adhesive layer, and as examples there may be mentioned rubber-, silicone- and acryl-based pressure-sensitive adhesives. Acrylic-based pressure-sensitive adhesives are preferred for their excellent transparency and resistance to migration of the adhesive components into the polycarbonate film. Acryl-based pressure-sensitive adhesives include solvent and emulsion types, but solvent-type pressure-sensitive adhesives are preferably used from the standpoint of adhesive strength and stability, including cohesion with the polyester film substrate.

The method of forming the pressure-sensitive adhesive layer may be any desired known method. For example, a solution may be prepared containing the pressure-sensitive adhesive and directly coated onto the polyester film substrate, and then dried by heating or the like, if necessary. An alternative is the transfer method, wherein the pressure-sensitive adhesive is coated onto a release sheet and dried, and then the polyester film is attached thereto to transfer the pressure-sensitive adhesive onto the polyester film surface. The coating method may be, for example, die coating, gravure roll coating, or the like.

The pressure-sensitive adhesive solution to be coated may be applied onto the polyester film at any desired stage. When the coating solution is to be coated onto the polyester film, enhanced cohesion and coatability of the surface of the polyester film may be achieved by pretreating it with physical surface treatment such as corona treatment, plasma discharge treatment or the like, or with chemical surface treatment with an organic resin- or inorganic resin-based coating, for stronger cohesion between the pressure-sensitive adhesive and the polyester film.

The thickness of the pressure-sensitive adhesive layer is preferably 1-500 μm, and more preferably 3-50 μm.

The adhesive strength between the plastic film and the polyester film provided with a pressure-sensitive adhesive on one side may be 3-50 gf (0.0294-0.49 N). If the adhesive strength is too weak, the plastic film and protective film will tend to separate when the wound laminate is slit, thereby limiting the mode of handling during the processing steps. It also undesirable because it can result in abnormal conditions such as flaking when the laminate is slit. If the adhesive strength is too great, the protective film becomes more difficult to release during the release step of the protective film just prior to punching the plastic film into a disk shape, thereby resulting in bending of the plastic film or damage to the plastic film, Also, transfer to the polycarbonate film and adhesion to that film may result in optical distortion or adhesion of dirt by static electricity. The adhesive strength with the plastic film is preferably 3-30 gf (0.0294-0.294 N; A sample width of 25 mm is used in the examples of the present specification, and this range is 1.16-11.6 N/m when calculated in terms of 1 m width).

(Winding in Film-forming Step)

As mentioned above, using a pressure-sensitive adhesive layer-coated polyethylene terephthalate film as the protective film in the winding step of the plastic film will allow satisfactory winding of the plastic film. After pulling out the edge of the pressure-sensitive adhesive layer-coated polyethylene terephthalate film from the roll and peeling off the release sheet or release film, it is attached with the polycarbonate film and nipped with a nip roll (The nip line pressure may be, for example, 10-2 kgf/1 m (98-19.6 N/m) and preferably 7-3 kgf/1 m (68.9-29.4 N/m).) to press out the air between the films, and both are wound together while preventing wrinkles. A wound laminate of the invention may be obtained in this manner.

(Post-processing of Wound Laminate Plastic Film)

The wound laminate of the invention may be provided with a cured resin layer on the side of the plastic film opposite the protective film, in order to increase the handleability during the optical disk fabrication steps or to confer hard coating properties, chemical resistance or the like. In order to prevent adhesion of dirt or facilitate removal of accumulated matter, the cured resin layer may also contain an antistatic agent and/or release agent.

(Optical Disk and Fabrication Process)

When the wound laminate of the invention is to be applied as the protective layer for an optical disk, the optical disk structure and fabrication process may be as described below.

A concave and convex pattern comprising pits or grooves for the recording data layer is formed on at least one side of a plastic substrate by injection molding. A concave and convex pattern may also be formed on a glass substrate using a photosensitive resin method (Glass 2P Method: Photopolymerization).

On the concave and convex pattern there is formed a reflective film made of aluminum or the like or a recording film made of a phase-converting material, magnetic recording material, organic pigment or the like, for a read-only ROM-type, write-only WORAM, or a rewritable RAM-type medium.

The aforementioned plastic film with a thickness of 30-100 μu is attached thereto through an adhesive layer to form a transparent protective layer. The adhesive layer may be a liquid adhesive such as an ultraviolet curing resin, thermosetting resin, epoxy resin or the like, or a film-like adhesive such as a pressure-sensitive adhesive, ultraviolet curing film or ultraviolet curing adhesive. The adhesive layer may be any one which is adhesive and optically transparent.

Figure 4:
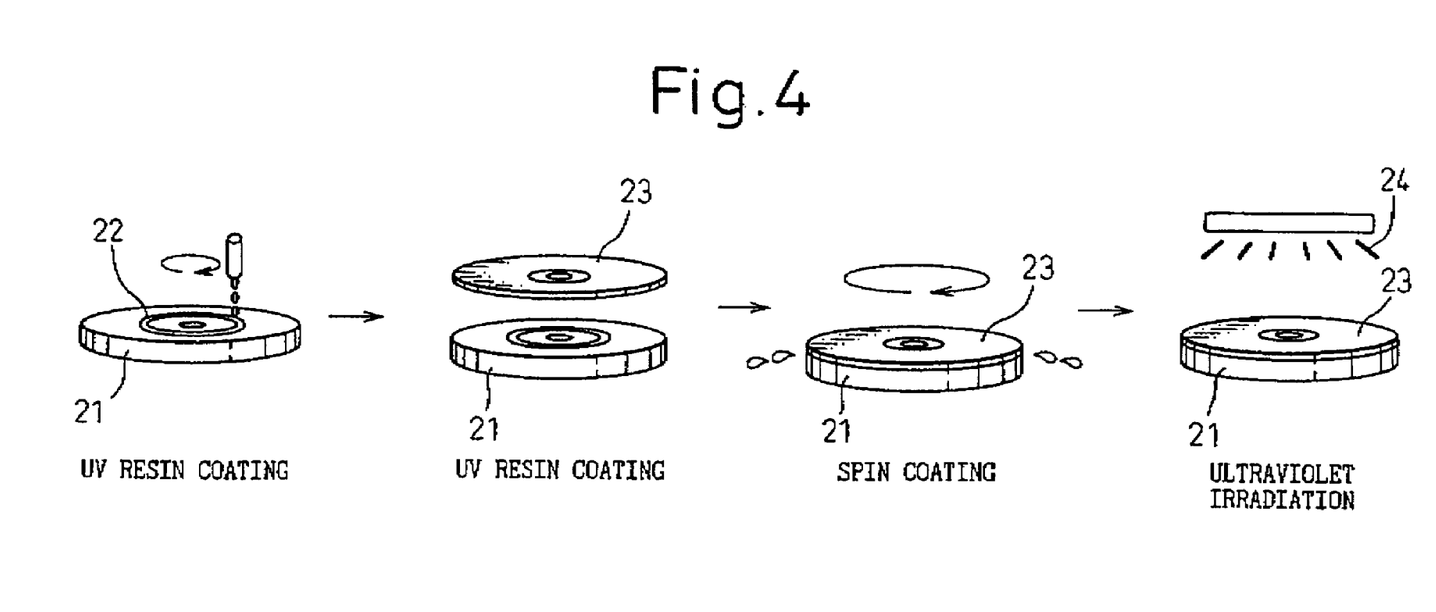
FIG. 4 is an illustration of a method for fabricating a transparent protective layer using a liquid adhesive.

The method of forming a transparent protective layer using a liquid adhesive such as an ultraviolet curing resin, as shown in FIG. 4, involves first pattern coating the ultraviolet curing resin 22 onto the disk substrate 21 in a ring form, and then placing a plastic film 23 punched out into a donut shape thereover prior to spin coating for even application of the ultraviolet curing resin, and performing irradiation with ultraviolet rays 24 to accomplish curing.

Figure 5:
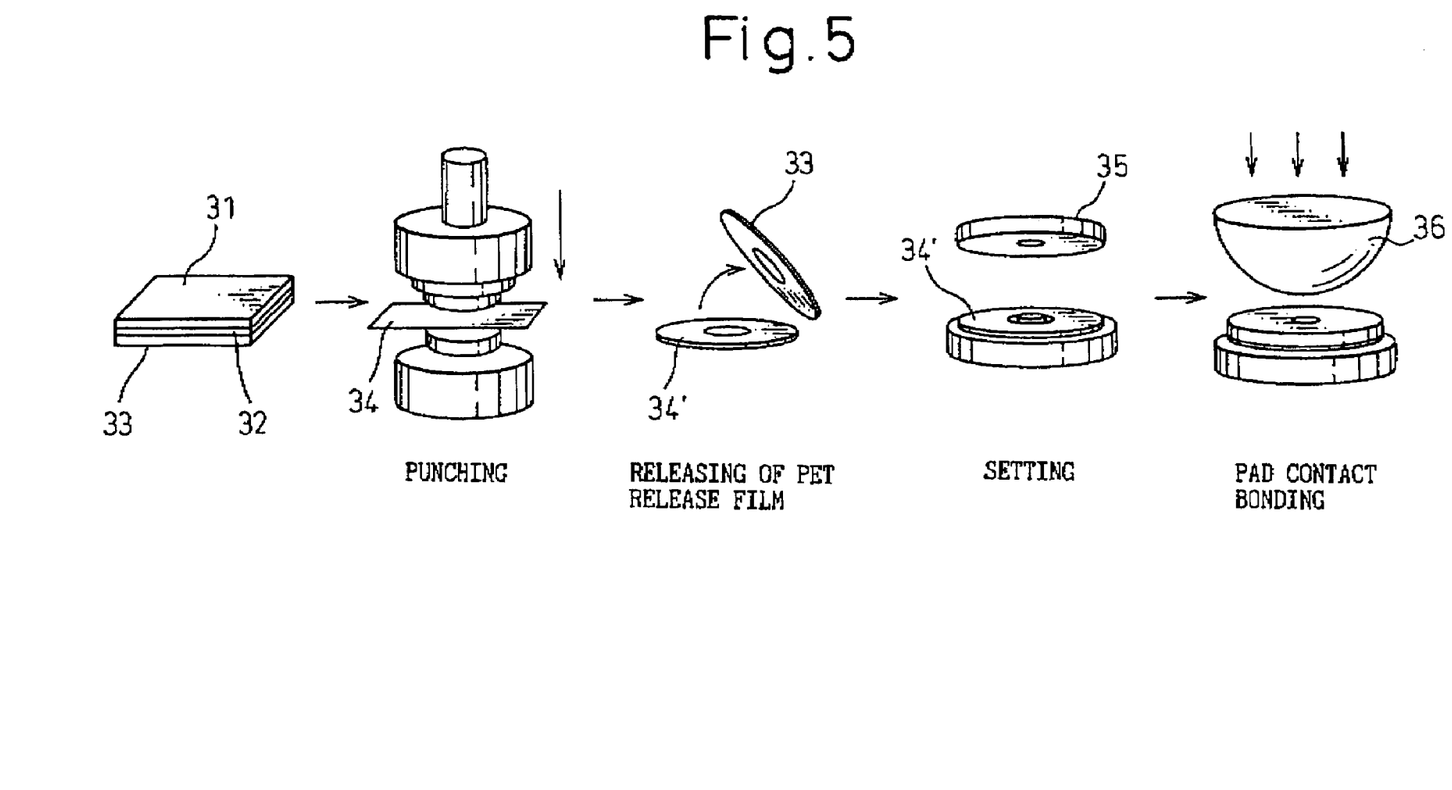
FIG. 5 and FIG. 6 are illustrations of a method for fabricatings transparent protective layer using a film-like like adhesive.
Figure 6:
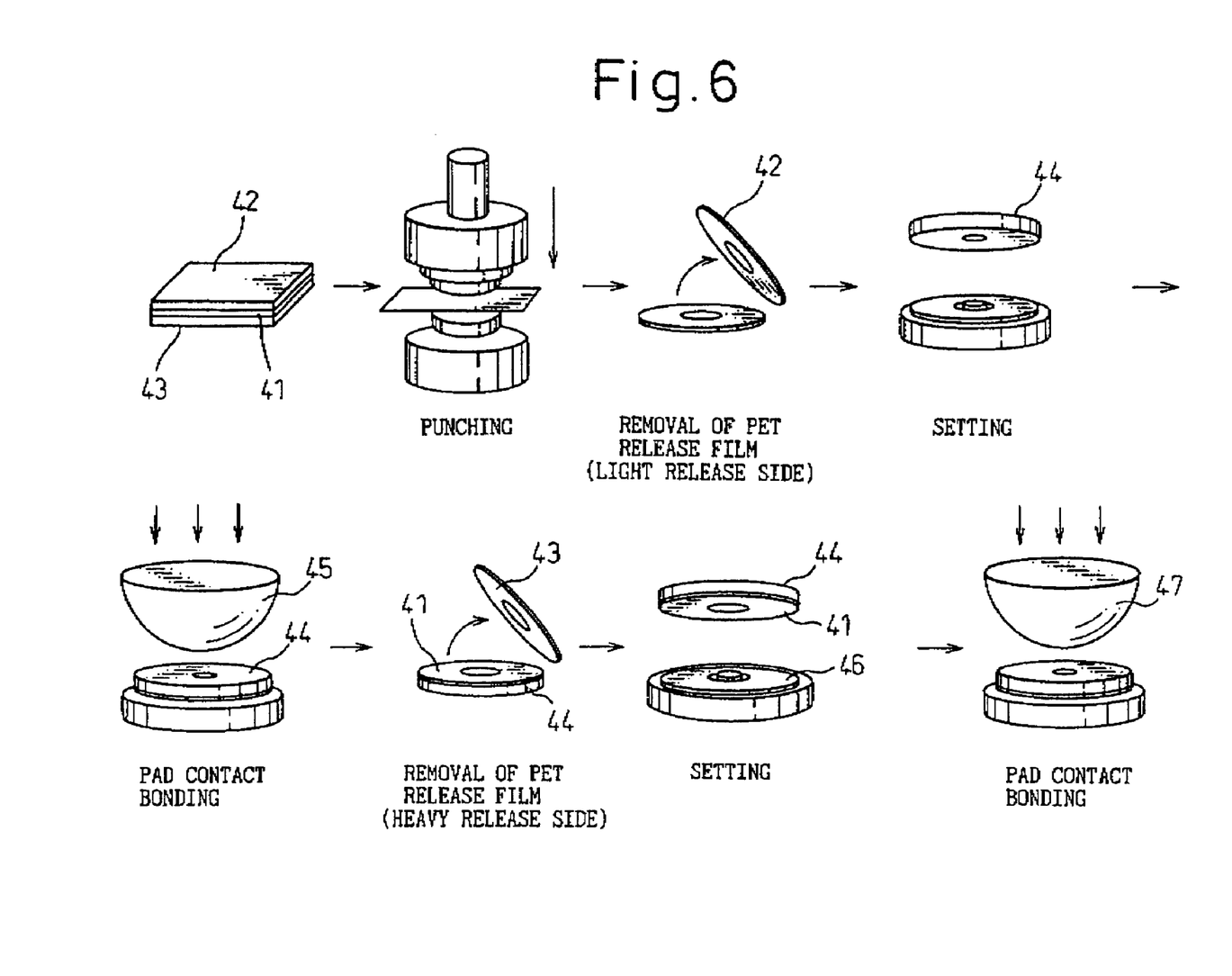

In the method of forming a transparent protective layer using a film-like adhesive such as a pressure-sensitive adhesive, as shown in FIG. 5, a plastic film 31 and adhesive 32 are laminated first, and then a polyethylene terephthalate (PET) release film 33 is attached to the other side of the adhesive for use as a substrate material 34. After punching this out into a donut shape, a pad 36 or roller is used for attachment to a disk substrate 35 to form a transparent protective layer. Alternatively, as shown in FIG. 6, a film-formed adhesive 41 is sandwiched between PET release films 42, 43 for use as a substrate material, and after punching out the adhesive into a donut shape, the light PET release film 42 is removed to allow attachment onto the disk substrate 44 using a pad 45 or roller, after which a plastic film 46 is punched out into a donut shape and a pad 47 or roller is used for attachment to the adhesive 41 side of the disk substrate 44 from which the PET release film 43 has been removed, to form a transparent protective layer.

The plastic film may be attached after removing the protective film from the wound laminate, or it may be removed after forming the transparent protective layer. The adhesion method is, incidentally, not limited to the method described above.

EXAMPLES

The present invention will now be explained in greater detail through examples, with the understanding that the invention is in no way restricted by these examples.

The measurements and effect evaluations in the examples were conducted according to the following methods.

1) Film Thickness Measurement

A full-width sample, 1 m in the winding direction, was taken of a polycarbonate film from a wound laminate after releasing the protective film. The sample was cut into square films with dimensions of 10 cm×10 cm in the winding direction and the width direction (the direction perpendicular to the winding direction) (when the remainder in the width direction exceeded 5 cm, this section was also included in the measurement sample), and the thickness of each was measured at the center using a micrometer by Mitsutoyo Co., Ltd. The average of 100 measured points was calculated and recorded as the film thickness.

2) Film Thickness Variation Measurement

Because thickness variation, such as thin streak-like thick sections, may be present at locations other than the points measured and may be missed in the micrometer measurement of 1) above, the thickness variation was continuously measured using a KG601A Film Thickness Tester by Anritsu Co., Ltd. The measured film was sampled in the following manner. Ten full-width samples were cut out continuously at 5 cm spacings in the film winding direction (Total: 50 cm in the film winding direction). The thickness distribution of each was measured with the film thickness tester and recorded on a recording sheet. The difference between the maximum and minimum values for the recorded thicknesses (referred to as the "thickness range") was determined for each of the 10 films, and the maximum "thickness range" was recorded as the film thickness variation.

3) Thermal Dimensional Change

Parent samples were taken at 3 locations from the full width of the polycarbonate film (The film width was approximately 1 m). A total of 30 samples, 10 from each parent sample, were prepared for measurement of the thermal dimensional change. The sizes of the samples for measurement of the thermal dimensional change were 150 mm in the film winding direction and 10 mm in the perpendicular direction, for 5 of the 10 samples from the parent sample, and 10 mm in the film winding direction and 150 mm in the perpendicular direction, for the other 5 samples. Each of the samples was stamped with marks at 100 mm spacings for measurement of the thermal dimensional change. Thus, measuring samples were prepared with 15 marks in the film winding direction and with 15 marks in the perpendicular direction (width direction).

The measuring samples were treated for 1 hour in a thermostat at 140° C. with no load and taken out to room temperature for cooling, and the mark spacings were measured. The dimensions were measured using a reading microscope under constant temperature, constant humidity conditions of 23° C., 65% RH. The dimensional change was determined in the following manner from the dimensions before and after heat treatment at 140° C.

Thermal dimensional change=[{(dimensions before treatment)−(dimensions after treatment)}/(dimensions before treatment)]×100%

4) Total Light Ray Transmittance

This measuring method corresponds to JIS K7105 and ASTM D1003.

Samples were taken at 3 locations in the width direction of the polycarbonate film (The film width was approximately 1 m). The total light ray transmittance of the samples was measured using a COH-300A Color oil Haze Measuring Instrument by Nippon Denshoku Industries Co., Ltd. Five measurements were made for each sample, and the average value of the total of 15 measurements for the 3 samples in the width direction was recorded as the total light ray transmittance. The measurement was made according to JIS K7105.

5) Measurement of Solvent Content of Polycarbonate Film

Approximately 5 g of the solvent-containing film was taken, dried for 1 hour in an air drier at 170° C., and then cooled to room temperature. The weight before and after drying was measured with a chemical balance, and the change was calculated. The solvent content based on solid portion was determined from this value. Specifically, the film (approximately 1 m width) was measured in 5 equal parts in the width direction. The measurement was carried out 3 times for different width directions, and the average value was determined. The individual measured values for the solvent content based on solid portion may be represented by the following formula, with the weight before drying designated as a and the weight after drying and cooling as b.

$$\{(a-b)/b\}\times 100\%$$

6) Measurement of In-plane Retardation Value Re.

Strip samples from the polycarbonate film, at the full width of 1 m and 40 mm long in the winding direction, were taken at 3 locations in the winding direction at 50 cm spacings. The film strips were cut at 40 mm spacings to prepare 40 mm-square measuring samples. As 3 sample strips were cut out and 25 squares were cut from the total 1000 mm length, as the full-width of the film, a total of 75 measuring samples were obtained. The in-plane retardation value Re. was measured for each of these samples. The values were expressed as the range of the Re. values, in terms of the minimum and maximum values. A KOBRA-21ADH refractive index measuring instrument by Oji Scientific Instruments Co., Ltd. was used to measure the in-plane retardation Re. with light rays incident in a direction normal to the film surface.

7) Measurement of Retardation Value K in Thickness Direction

Samples were taken and measured with the KOBRA-21ADH in the same manner as 6) above. The retardation was measured while rotating each polycarbonate film sample on its retarding phase or advancing phase axis and varying the angle of incidence, and the refractive indexes $n_x$, $n_y$ and $n_z$ were calculated from the data. These values were then used to calculate the K value=$((n_x+n_y)/2-n_z)\times d$ (nm units). Here, $n_x$ represents the refractive index in the winding direction, $n_y$ represents the refractive index in the direction perpendicular to the winding direction, $n_z$ represents the refractive index in the thickness direction, and d represents the thickness of the measured film. The units of the K value were μm for the above calculation, but this was converted to nm. Throughout the present specification, the maximum K value is the maximum value among these values.

8) Measurement of Center Line Mean Surface Roughness (Ra) of Support

The center line mean surface roughness (Ra) is the value defined by JIS-B0601, and the values in the present specification were measured using a contact surface roughness analyzer (Surfcorder, SE-30C) by Kosaka Laboratory, Ltd.

The Ra measuring conditions were as follows.

Stylus tip radius: 2 μm
Measuring pressure: 30 mg
Cutoff: 0.08 mm
Measuring length: 1.0 mm Samples were taken at 3 locations from the full width of the film, in the same manner as for the parent samples of 3) above. Five measurements were made for each sample and, after eliminating the largest value among the measured values (up to 4 decimal places in μm units), the remaining 4 data for all of the 3 locations (12 values) were averaged and rounded to the nearest 4th decimal place and expressed in nm units.

9) Measurement of Protective Film Adhesive Strength

The measuring method was according to JIS Z0237.

A polycarbonate plastic film and a pressure-sensitive adhesive-coated polyester film were pressed together with rollers at room temperature to fabricate a laminated sheet. The line pressure for pressing was adjusted to 5 kgf/1 m. A 25 mm-wide, 150 mm-long sample strip was cut out from the laminated sheet. A miniature Tensilon was used for the measurement, whereby the edge of the carbonate film and the edge of the polyester film were anchored with a chuck and the peel strength was measured by the 180° peel method. The peeling speed was 300 mm/min.

10) Evaluation of Film Protective Layer Flatness (Optical Distortion)

The method of fabricating the optical disk substrate used for evaluation will be explained first.

An aluminum film was formed on the surface of a 12 cm-diameter polycarbonate or glass optical disk substrate by sputtering, as a reflective film layer, and a polycarbonate film was attached over the reflective film using an ultraviolet curing resin, as a light transmitting layer. Specifically, the aluminum side of the optical disk was coated with an ultraviolet curing resin in a ring-shaped pattern, a polycarbonate film punched out to an outer diameter of 118 mm and an inner diameter of 22.8 mm was placed thereover and spin coating (for example, 5000 rpm, 30 sec) was performed to form a film of the ultraviolet curing resin to uniform thickness. These were then bonded together by irradiation with ultraviolet rays.

For evaluation of the flatness, the optical disk was set in a drive device and rotated while a focus servo was directed onto the aluminum reflective film side through the light transmitting layer (transparent protective layer), and the amplitudes of the focus error signals were compared. Poor flatness (large optical distortion) of the polycarbonate film increases the amplitude of error signals by altering the optical path. Since focus errors are caused by swelling of the surface of the optical disk substrate itself, vibration of the spindle motor, etc., and are also affected by the servo properties, the comparison was made using the same substrate and the same drive device. Also, comparing the error signals using a high pass filter (HPF) based on the frequency component of 1-4 KHz or greater allowed a clearer comparison of the difference in flatness of the polycarbonate film.

Example 1 and Comparative Example 1

Aromatic polycarbonate resin pellets ("PANLITE™ (Grade C-1400QJ)" by Teijin Chemicals, Ltd.) with a viscosity-average molecular weight of 38,000 were air-dried for 16 hours at 120° C. and then cooled to 30° C. with dehumidified air. The aromatic polycarbonate resin pellets were dissolved in a methylene chloride solvent to prepare an 18 wt % solution. The solution was passed through a filter to remove contamination. The temperature of the solution was then adjusted to 15±0.5° C., and it was introduced into a 1200 mm-width coat-hanger die and then cast onto the aforementioned support as a liquid film of approximately 450 μm. The support-temperature (surface temperature) just prior to casting was adjusted to 9° C. The cast film was dried in the following manner.

(Compartment 1) For initial drying, warm air at 30° C. was blown onto the back of the support to heat it, and the film atmosphere temperature was adjusted to 20° C. for drying while taking care to avoid film deformation (leveling defects). (For solution casting, the condition immediately after casting is more properly referred to as a solution film, or liquid film, but here it will also be referred to simply as a "film".)

(Compartment 2) warm air was blown in to adjust the atmosphere temperature to 45° C., and drying was effected to a methylene chloride concentration of about 35 wt % in the film.

(Compartment 3) Warm air was blown in to adjust the atmosphere temperature to 50° C., and drying was effected to a solvent content of 25 wt % in the film.

(Compartment 4) Drying was effected at an atmosphere temperature of 55° C. in this compartment. Here, the solvent content in the film was adjusted to 20 wt %.

(Compartment 5) The polycarbonate film was cooled together with the support in an atmosphere at 15° C. in this compartment. The solvent content in the film upon completion of this step was 18 wt %.

The film was then released from the support. The released film was further fed to a pin tenter-type drier and transported while drying.

In the pin tenter, both edges of the film were clasped with pins for transport of the polycarbonate film. Each of the zones of the pin tenter was divided into 6 zones. Because drying of the polycarbonate film proceeds from the entry port of the pin tenter and the width thus contracts accordingly, the drying was carried out with a narrowing rail width in the pin tenter to match the contraction in the width. This is because the hot air temperature increases toward the latter half of the pin tenter step thus accelerating drying of the polycarbonate film. The pin tenter rail width was therefore set so as to prevent excessive molecular orientation of the polycarbonate film and to prevent excessive increase in the in-plane retardation value. The hot air temperatures at the initial zones were set to 90° C., 110° C. and 120° C., and the temperatures of the middle zones 4 and 5 were set to 130° C., with the polycarbonate film being cut off at the pin pierced section at zone 5. The hot air temperature was 135° C. in zone 6. At the exit port of the pin tenter, the pulling tension on the polycarbonate film was 5 kgf/1 m width, at approximately room temperature. The film was then run through a roll hanging drier. The roll hanging drier was divided into two chambers, with the first chamber at a hot air temperature of 135° C. and the second chamber at a hot air temperature of 145° C., and the film was pulled at a tension of 1.5 kgf/1 m width (14.7 N/m). The width of the obtained film was 1.0 m.

The properties of the polycarbonate film obtained in this manner were as follows.

The polycarbonate film had a thickness of 75 μm, and thickness variation of 1.0 μm. The thermal dimensional change was 0.06%, the total light ray transmittance was 90%, the solvent content was 0.25%, the in-plane retardation was 4-10 nm, the surface roughness Ra. was 1.8 nm on both sides, and the maximum K value was 78 nm. Just before winding the obtained polycarbonate film with a winder, it was combined with the pressure-sensitive adhesive layer side of a protective film comprising a 20 μm-thick biaxially drawn polyethylene terephthalate film (Young's modulus: 530 kg/mm² (5197 MPa) for both width and length; surface roughness Ra.: 25 nm on both sides (for polyester, the surface roughness Ra. of the film was adjusted by addition of 0.25 wt % of lubricant with particle size of 0.6 μm)) with a pressure-sensitive adhesive layer, nipped at a line pressure of 5 kgf/1 m (49 N/m), and wound up into a roll to a length of 500 m to form a wound laminate. The adhesive strength between the polycarbonate film and the protective film was 98 gf (0.096 N, or 3.84 N/m, converting from a sample width of 25 mm to 1 m).

The pressure-sensitive adhesive layer was formed in the following manner. One side of the biaxially drawn polyethylene terephthalate film was first subjected to corona treatment. An acryl-based pressure-sensitive adhesive was then prepared as a polymer for a pressure-sensitive adhesive, by solution polymerization of 2-ethylhexyl acrylate as the main monomer, methyl acrylate as the comonomer and hydroxyethyl methacrylate as the functional group-containing monomer in a ratio of 3:1:1, and using ethyl acetate as the solvent and azobisisobutyronitrile as the reaction catalyst, according to a known method. A TDI-based isocyanate crosslinking agent was added to the adhesive polymer, and then the release layer of a release sheet formed by the method described below was coated therewith to a post-drying thickness of 10 μm, to form a pressure-sensitive adhesive layer. The pressure-sensitive adhesive layer was then attached to the corona-treated side of the polyethylene terephthalate biaxially drawn film, and a pressure-sensitive adhesive layer was formed on the polyethylene terephthalate biaxially drawn film by transfer. The release sheet used was obtained by forming a release layer composed of curable silicone to a thickness of 0.1 μm on a 38 μm polyethylene terephthalate film.

After storing the wound laminate at room temperature for 6 months, the flatness of the film was evaluated. Specifically, the film was wound off from the wound laminate and slit. Five wound laminates with a width of 170 mm were prepared from the 1 m-width parent wound laminate. From the rolls at the center and both edges in the width direction among these 5 wound laminates there were taken samples at the surface, at 250 m from the core, and at the core. The samples were thus cut at 3 locations along the width of the film, for a total of 9 samples. The samples were punched out into disk shapes and attached to aluminum-coated glass panels with an ultraviolet curing resin to fabricate evaluation disks.

The light transmitting layer-provided optical disk substrates obtained in the manner described above were used for measurement of the actual focus residue. The focus was directed while rotating the disk at a linear speed of 7.9 m/s, the extracted focus error signal was passed through a 4 kHz high pass filter (HPF) and the high-pass residue component alone was extracted. The lens NA was 0.85, and the laser wavelength was 405 nm.

The maximum amplitude values for the high-pass residue signal are shown below. For comparison, measurement was also made at the center of the core of a wound laminate prepared using polyethylene/polyvinyl acetate as the protective film.

| Protective film type | Winding position | Width position | Focus error (arbitrary units) |
|---|---|---|---|
| Polyethylene terephthalate/ pressure-sensitive adhesive | surface layer | right edge | 0.045 |
| | surface layer | center | 0.048 |
| | surface layer | left edge | 0.047 |
| | middle | right edge | 0.044 |
| | middle | center | 0.048 |
| | middle | left edge | 0.045 |
| | core | right edge | 0.047 |
| | core | center | 0.042 |
| | core | left edge | 0.045 |
| Polyethylene/ polyvinyl acetate copolymer | core | center | 0.079 |

These data indicated that all of the film samples of Example 1 fabricated from the surface layer, middle layer and core exhibited no change in optical distortion, and therefore maintained highly satisfactory properties. In Comparative Example 1, the focus error was significant and the optical distortion was large, indicating deteriorated properties.

INDUSTRIAL APPLICABILITY

According to the present invention it is possible to provide a wound laminate with an excellent high degree of flatness, virtually no optical distortion and satisfactory optical uniformity. When the polycarbonate film is used as a transparent protective layer for a high-density optical disk, it is possible to provide a data recording medium in a simple and highly industrially productive manner with substantially no optical distortion.

The invention claimed is:

1. A wound laminate obtained by laminating a plastic film composed of an aromatic polycarbonate comprising bisphenol A as an aromatic dihydroxy component, and a protective film composed of an aromatic polyester, using an intervening pressure-sensitive adhesive having a weak adhesive strength of 3-50 gf (0.0294-0.49 N), and winding the laminate.

2. A wound laminate according to claim 1, wherein the plastic film has thickness variation of no greater than 4 μm, a thermal dimensional change of no greater than 0.07%, and an in-plane retardation of no greater than 15 nm.

3. A wound laminate according to claim 1, wherein the protective film is a polyester film composed of polyethylene terephthalate or polyethylene naphthalate and having a Young's modulus of 450 kgf/nm² (4413 MPa) or greater.

4. A wound laminate according to claim 2, wherein the plastic film has a thickness of 30-100 μm, a total light ray transmittance of at least 90%, a residual solvent content of no greater than 0.3 wt%, a thickness-direction retardation (K vaule) of no greater than 100 nm, and a surface roughness Ra of no greater than 5.0 nm on both sides.

5. A wound laminate according to claim 1, wherein the plastic film is formed by a solution casting process.

6. A wound laminate according to claim 1, which is used to form a transparent protective layer on an optical disk.

7. A process for fabricating an optical disk, comprising providing a wound laminate as set forth in any one of claims 1 to 6 and applying a portion of the wound laminate as a transparent protective layer on a film surface side-incident optical disk to fabricate an optical disk.

8. A process for fabricating an optical disk according to claim 7, which comprises a step of punching out a disk-shaped laminate film from said wound laminate and a step of adhering the plastic film of the disk-shaped laminate film onto an optical disk substrate.

9. A process for fabricating an optical disk production process according to claim 8, wherein the plastic film is adhered to the optical disk substrate after the protective film is released from said disk-shaped laminate film.

10. A process for fabricating an optical disk production process according to claim 8, wherein the protective film is released from said disk-shaped laminate film after the plastic film of the disk-shaped laminate film is adhered onto the optical disk substrate.

11. A process for fabricating an optical disk according to claim 8, wherein the plastic film and optical disk substrate are adhered using a liquid adhesive or film-like adhesive.

* * * * *